United States Patent [19]
Wagoner

[11] 3,939,678
[45] Feb. 24, 1976

[54] TELEPHONE LOCKING APPARATUS

[75] Inventor: Floyd M. Wagoner, Merrillville, Ind.

[73] Assignee: New Product Development Corporation, Chicago, Ill.

[22] Filed: Jan. 6, 1975

[21] Appl. No.: 538,811

[52] U.S. Cl. ............... 70/57; 70/461; 70/DIG. 72; 179/189 R
[51] Int. Cl.² .......................................... E05B 65/00
[58] Field of Search ............ 70/14, 57, 58, DIG. 57, 70/DIG. 72, 461; 179/189 R, 188 D

[56] References Cited
UNITED STATES PATENTS

| | | | |
|---|---|---|---|
| 3,469,041 | 9/1969 | Winston | 179/189 R |
| 3,624,317 | 11/1971 | Buckingham | 179/189 R |

*Primary Examiner*—Robert L. Wolfe
*Attorney, Agent, or Firm*—Molinare, Allegretti, Newitt & Witcoff

[57] ABSTRACT

A telephone locking apparatus. The apparatus includes a base plate and keeper plate which cooperatively define jaw means for clamping the apparatus to the handhold shelf of a telephone desk set. The apparatus also includes a locking plate hingedly connected to the base plate and interlockable therewith for maintaining the switch hooks of the telephone in a depressed state to substantially avoid unauthorized use of the telephone.

10 Claims, 4 Drawing Figures

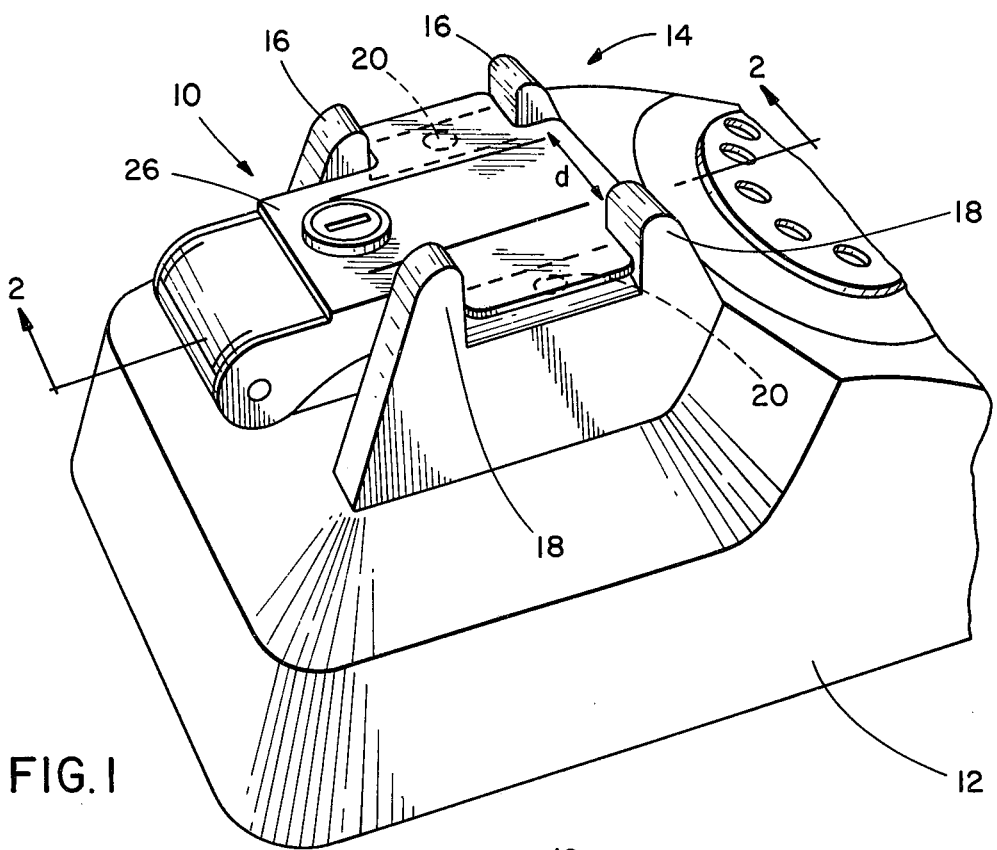
FIG. 1
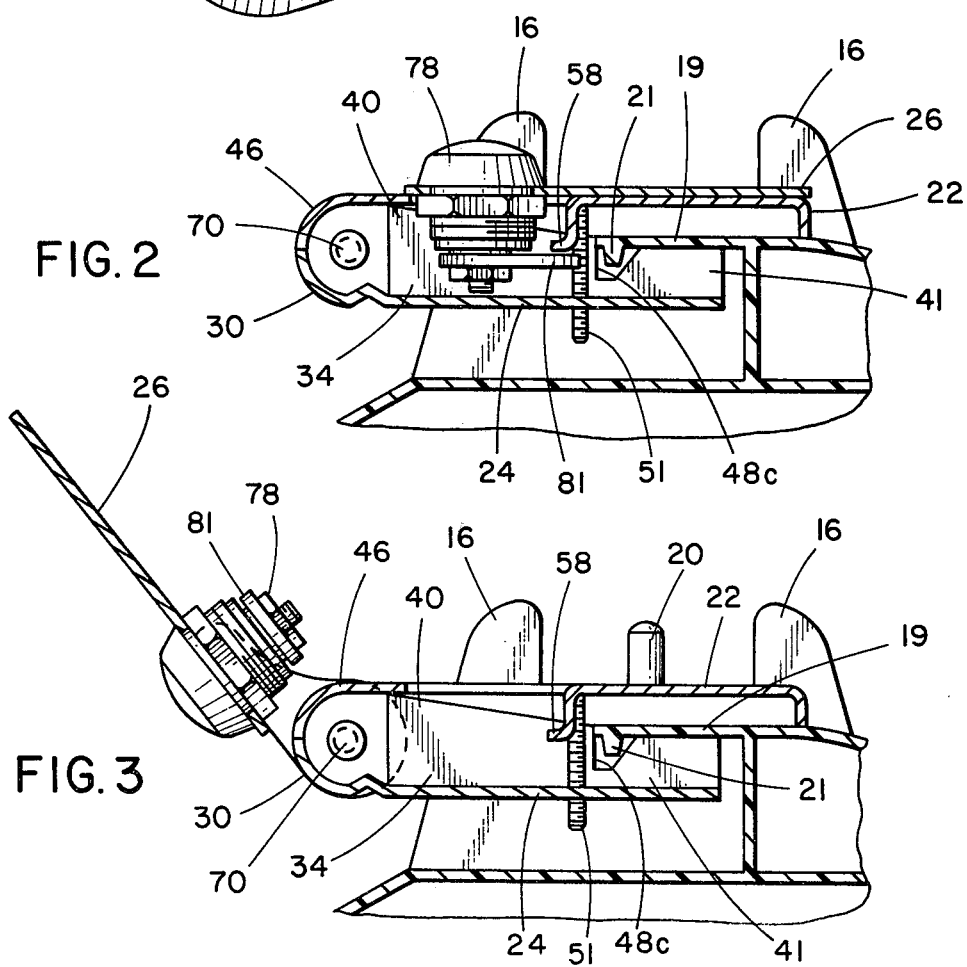
FIG. 2
FIG. 3

TELEPHONE LOCKING APPARATUS

BACKGROUND OF THE INVENTION

The present invention relates generally to a telephone locking apparatus and, more particularly, to an apparatus for locking the switch hooks of a telephone desk set in a depressed state and thereby rendering the telephone inoperative.

As well known, telephone services are provided at a rate dependent upon usage. Unauthorized telephone usage can, therefore, present a significant financial problem to a business or corporation.

Numerous telephone locking devices are presently available. However, the presently known devices suffer from a variety of shortcomings, rendering the devices highly undesirable.

One known and very popular locking device engages the first dialing aperture of a telephone and prohibits rotation of the dial mechanism. As such, this locking device can only be used with a dial-type telephone. The device is totally incompatible with the increasingly popular push button telephone.

Several of the presently known locking devices are easily manipulated and removed from the telephone set. Thus, protection against unauthorized use is only minimal.

Often the telephone lock interferes with the operation of the telephone unit. For example, the lock is secured to the cradle of the telephone base, such that the handset cannot be placed in the typical "at rest" position upon the cradle. The handset must either be placed next to the base unit or awkwardly balanced on the locking device. This, however, presents an unsightly appearance.

All of the presently known telephone locking devices must be completely removed to operate or use the telephone. As such, the lock must be replaced or refastened with each and every authorized use. This burden often attributes to a lack of cooperation on the part of authorized users, as well as the loss and/or misplacement of the locking device.

Further, the presently known locking devices are not universally designed or dimensioned. Thus, the lock is incompatible with telephone sets produced by various manufacturers, particularly foreign manufacturers.

SUMMARY OF THE INVENTION

In a principal aspect, the present invention is a telephone locking apparatus for use in combination with all types of telephone desk sets. The apparatus includes a base plate, keeper plate and locking plate. The base and keeper plates are interconnected and define, in cooperation, jaw means for clamping the handhold shelf of the telephone base, rigidly securing the apparatus to the telephone.

The locking plate is hingedly secured to the base plate. In a first operable or locking state, the locking plate engages and depresses the switch hook of the telephone unit. The locking plate is selectively interlocked with the base plate to substantially avoid unauthorized use of the telephone.

It is thus an object of the present invention to provide an apparatus for locking a telephone unit which is inexpensively manufactured and readily operated.

It is a further object of the present invention to provide a telephone locking apparatus which may be used with both dial and push button telephones.

It is also an object of the present invention to provide a telephone locking apparatus universally compatible with telephone desk sets, regardless of dimensions and contours.

It is another object of the present invention to provide a telephone locking device which is permanently affixed to the telephone, and thus, need only be mounted a single time.

It is also an object of the present invention to provide a telephone locking apparatus which does not interfere with the basic design and operation of the telephone unit.

These and other objects, advantages and features of the present invention are set forth in the following detailed description.

BRIEF DESCRIPTION OF THE DRAWING

A preferred embodiment of the present invention will be described, in detail, with reference to the drawing wherein:

FIG. 1 is a perspective view of a preferred embodiment of the present invention mounted on the base of a telephone desk set;

FIG. 2 is a cross-sectional view of the preferred embodiment shown in FIG. 1 taken along the lines 2—2;

FIG. 3 shows a preferred embodiment of FIG. 2 in an open state; and

DESCRIPTION OF THE PREFERRED EMBODIMENT

Figure 4:
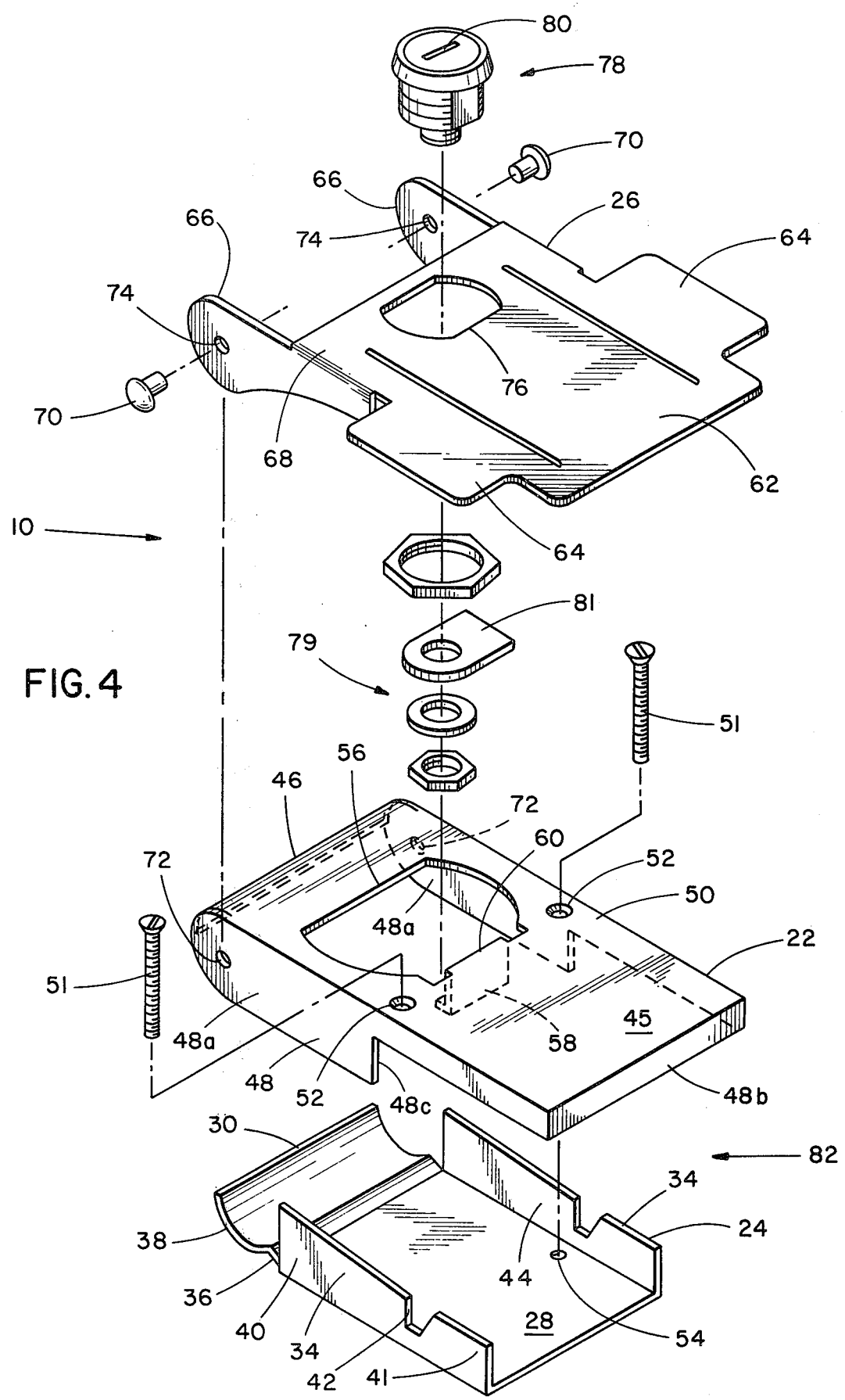
FIG. 4 is an exploded view of the preferred embodiment shown in FIG. 1.

A preferred embodiment of the present invention is shown in FIG. 1 as a telephone locking apparatus 10 mounted on a base 12 of a telephone desk set. The base or telephone 12 includes a cradle, generally designated 14 and defined by a pair of cradle guides 16, 18, a handhold shelf 19, shown in FIGS. 2 and 3, and switch hooks 20, shown in phantom in FIG. 1. As shown in FIGS. 2 and 3, the handhold shelf 19 includes a downwardly extending lip 21. In normal operation, a handset (not shown) rests on the cradle 14 during periods of non-use, thereby depressing the switch hooks 20 to deactivate the telephone 12.

The locking apparatus 10 is preferably metal. However, other materials, such as plastic, can be used.

Additionally, a dial telephone 12 is shown in FIG. 1. This is illustrative only and the apparatus 10 is compatible with a push button telephone.

Referring now to FIGS. 2, 3 and 4, the apparatus 10 includes principally a base plate 22, a keeper plate 24 and a locking plate 26. As shown, the keeper plate 24 includes a substantially rectangular bottom 28, a first end wall 30, and a pair of side walls 34. As best shown in FIGS. 2 and 3, the first end wall 30 extends from the bottom 28 alone and includes an upwardly inclined, substantially planar portion 36 and a curved or rolled portion 38.

The side walls 34 are substantially perpendicular to the bottom 28 and extend from opposing sides or edges thereof. Each side wall 34 includes a first end portion 40, adjacent the first end wall 30, and a second end portion 41, opposite the first end wall 30. The side wall 34 has its greatest height at the first end portion 40, and thus, the keeper plate 24 is deepest at the first end portion 40. As shown, the side walls 34 incline downwardly from the first end portion 40 to a substantially trapezoidal, upwardly opening notch 42 in an intermediate portion of the side wall 34, generally designated 44. Preferably, the side walls 34 also incline downwardly from the second end portion 41 to the notch 42.

The base plate 22 is substantially rectangular and box-shaped. As shown, the base plate 22 includes a substantially planar top 45. The base plate 22 also includes a rolled or round end 46 and a substantially perimetric wall 48, extending along the edge of the top 45 opposite the rolled end 46. The wall 48 is substantially perpendicular to the top 45 and includes portions 48a, 48b having two different heights. The portions 48a are adjacent the rolled end 46 and extend substantially to a midpoint of the top 45 generally designated 50. The height of the portions 48a is greater than the height of the portion 48b, such that the wall 48 defines a pair of substantially vertical edges 48c. The opposite ends of the wall portions 48a are curved to conform to the contour of the rolled end 46.

The keeper plate 24 is secured to the base plate 22 by a pair of screws 51. The screws 51 engage holes 52, 54 in the plates 22, 24, respectively. As shown, the holes 52, 54 are substantially aligned with the edge 48c and notch 42, respectively.

The base plate 22 also defines an aperture 56 extending longitudinally from substantially the midpoint 50 towards the rolled end 46. An L-shaped lip 58 extends downwardly from a front edge 60 of the aperture 56, as shown.

The locking plate 26 includes a substantially planar shelf cover 62, having a pair of transversely extending wings 64, and mounting projections 66. As best shown in FIG. 1, the cover 62 is substantially the same width as the cradle 14, i.e., the distance d between the cradle guides 16, 18. The mounting projections 66 are substantially perpendicular to the cover 62 and extend from a first end 68, opposite the wings 64.

As best shown in FIG. 4, the locking plate 26 is pivotally or hingedly secured to the wall portions 48a of the base plate 22 by pins 70. The pins 70 are received by openings 72, 74 in the walls 48 and mounting projections 66, respectively. The openings 72 are located substantially within the curved ends of the wall portions 48a.

The locking plate 26 also includes an aperture 76. A cylinder lock 78 engages the aperture 76 and is rigidly secured to the locking plate 26 by means of securing nuts, generally designated 79. The cylinder lock 78 includes a key slot 80 and a rotatable flange 81. The flange 81 is operable in a first position, shown in FIG. 4, and a second position wherein the flange 81 is rotated 90° away from the projections 66. The cylinder lock 78 is operated by a key (not shown), distributed to authorized users of the telephone 12.

The apparatus 10 is shown in an assembled state in FIGS. 2 and 3. As shown, the keeper plate 24 fits substantially within the box-shaped base plate 22. More particularly, a portion of the keeper plate 24 is enclosed by the wall portions 48a.

The wall portion 48b of the base plate 22 engages the upper surface of the handhold shelf 19 and the edges 48c abut against the lip 21. The keeper plate 24 engages both the base plate 22 and the lower surface of the handhold shelf 19. More specifically, as the screws 51 are tightened to install the apparatus 10, the first end portions 40 of the side walls 34 initially engage the top 45 of the base plate 22. With further tightening, the keeper plate 24 pivots substantially about the engagement of first end portions 40 and base plate 22, such that the second end portion 41 engages the handhold shelf 19, securing the apparatus 10. As such, the base plate 22, keeper plate 24 and screws 51, i.e., means for connecting the base plate 22 and keeper plate 24, cooperatively define jaw means, generally designated 82, for clamping the apparatus 10 to the base 12 of a telephone desk set.

The clamping or pinching action of the base plate 22 and keeper plate 24 rigidly secures the apparatus 10 to the handhold shelf 19. As shown, the notch 42 receives the lip 21 of the handhold shelf 19 to substantially avoid interference with the clamping operation. The edge 48c of the base plate 22, in abutment with the handhold shelf 19, facilitates installation by substantially aligning the cooperating features of the apparatus 10 and telephone 12.

In a first operational or locking state, shown in FIGS. 1 and 2, the locking plate 26 is rotated onto the base plate 22, such that the wings 64 interpose the cradle guides 16, 18 and depress the switchhooks 20. The apertures 56, 76 substantially align in this state, such that the rotatable flange 81 interposes the base plate 22 and keeper plate 24. The locking plate 26 is selectively interlocked with the base plate 22 by rotation of flange 81 to its second operational position, as described above. More particularly, the flange 81 is rotated into engagement with the L-shaped lip 58, as shown in FIG. 2. Unauthorized use of the telephone 12 is, therefore, substantially avoided.

Rotation of the flange 81 to its first operational position, shown in FIG. 4, and rotation of the locking plate 26 away from the base plate 22 permits authorized use of the telephone. That is, the switch hooks 20 are released. As best shown in FIG. 4, the size of aperture 56 is sufficient to substantially avoid interference between the base plate 22 and flange 81 as the locking plate 26 is rotated.

The apparatus 10 is permanently mounted upon the telephone 12. This substantially avoids the inconvenience of re-mounting or re-fastening after each authorized use, as experienced with the presently known locking devices. Further, the apparatus 10 cannot be lost or misplaced.

As best shown in FIG. 1, the locking plate 26 substantially covers the screws 51 in the locking state. Thus, tampering with the apparatus 10, while in the locking state, is substantially avoided. The first end wall 30 of the keeper plate 24 also abuts and conforms to the rolled end 46 of the base plate 22 to provide a continuous and smooth end to the apparatus 10. The telephone 12 may be conveniently carried by means of this end.

Additionally, the locking plate 26 and more particularly the shelf cover 62 provide, in the first operational state, a platform, which cooperates with the cradle guides 16, 18 to define a substitute cradle for the telephone handset. Thus, the apparatus 10 permits normal use and operation of the telephone 12.

Significantly, the clamping of the base plate 22 and keeper plate 24 to the handhold shelf 19 can be effected with only minimum physical contact between the handhold shelf 19, base plate 22 and keeper plate 24. Basically, the base plate 22 and keeper plate 24 need only engage the handhold shelf 19 at points on opposite side thereof. Thus, the shape and contour of the handhold shelf 19 and telephone 12 are relatively immaterial in the clamping action. As such, the apparatus 10 is substantially compatible with all telephone desk sets, despite slight variations and differences in design.

A single perferred embodiment of the present invention has been disclosed and described. It should be understood, however, that various changes and modifications can be made without departing from the true scope and spirit of the present invention, as defined by the following claims.

What is claimed is:

1. An apparatus for locking a telephone, said telephone having a switch hook and a handhold shelf, comprising, in combination:

means for rigidly attaching said apparatus to said telephone, said attaching means including a base plate, a keeper plate, and means for adjustably securing said base plate to said keeper plate, said keeper plate having a pair of side walls, said side wall having a first end portion, an intermediate portion and a second end portion, said side wall having a height greatest at said first end portion and inclining downwardly from said first end portion to said intermediate portion, said first end portion engaging said base plate in an assembled state, said base plate, keeper plate and securing means cooperatively defining jaw means for adjustably clamping said handhold shelf, said keeper plate pivoting substantially about said engagement of said first end portion and said base plate as said securing means is adjusted;

a locking plate hingedly connected to said attaching means and operable in at least a first state, said locking plate engaging and depressing said switch hook in said first state; and means for selectively interlocking said locking plate and said attaching means whenever said locking plate is in said first state, said interlocking means being fixedly secured to said locking plate, said attaching means substantially enclosing said interlocking means in said first state, whereby tampering with said interlocking means in said first state is substantially avoided.

2. An apparatus as claimed in claim 1 wherein said interlocking means includes a cylinder lock having a rotatable flange member, said rotatable flange member interposing said base plate and said keeper plate in said first state.

3. An apparatus as claimed in claim 2 wherein said base plate defines an aperture for receipt of said cylinder lock, said rotatable flange member being operable in a locking state to engage said base plate, whereby said locking plate is locked relative to said base plate.

4. An apparatus as claimed in claim 1 wherein said base plate engages the top of said handhold shelf and said keeper plate engages the bottom thereof.

5. An apparatus as claimed in claim 1 wherein said handhold shelf includes a downwardly extending lip, said side wall of said keeper plate defining an upwardly opening notch in said intermediate portion, said upwardly opening notch receiving said downwardly extending lip in said assembled state.

6. An apparatus as claimed in claim 1 wherein said base plate defines a substantially vertical edge, said edge abutting said handhold shelf in said assembled state.

7. An apparatus as claimed in claim 1 wherein said side wall of said keeper plate inclines downwardly from said second end portion to said intermediate portion, whereby said second end portion engages the bottom of said handhold shelf in said assembled state.

8. An apparatus claimed in claim 1 wherein said locking plate substantially conceals said securing means in said first state, whereby unauthorized removal of said apparatus from said telephone is substantially avoided.

9. An apparatus claimed in claim 1 wherein said base plate and said keeper plate cooperatively define a rounded continuous end adjacent said first end portion of said side wall, such that said telephone is transportable.

10. An apparatus as claimed in claim 1 wherein said locking plate includes a pair of extending wings for engagement and depression of said switch hook.

* * * * *